United States Patent [19]
Baker et al.

[11] Patent Number: 6,163,563
[45] Date of Patent: Dec. 19, 2000

[54] DIGITAL COMMUNICATION SYSTEM FOR HIGH-SPEED COMPLEX CORRELATION

[75] Inventors: Thomas Wesley Baker, North Whitehall Township, Lehigh County, Pa.; Richard Adam Cesari, Dallas, Tex.; Ravi Kumar Kolagotla, Lansdale, Pa.

[73] Assignee: Lucent Technologies Inc., Murray Hill, N.J.

[21] Appl. No.: 08/997,715

[22] Filed: Dec. 23, 1997

Related U.S. Application Data

[60] Provisional application No. 60/034,812, Dec. 31, 1996.

[51] Int. Cl.$^7$ ....................................................... A61F 2/06
[52] U.S. Cl. ........................................... 375/130; 375/150
[58] Field of Search .................................... 375/130, 147, 375/150, 139, 136, 152, 343; 370/342, 320, 335, 515; 708/422

[56] References Cited

U.S. PATENT DOCUMENTS

| | | | |
|---|---|---|---|
| 4,400,790 | 8/1983 | Chambers et al. | 375/343 |
| 4,707,839 | 11/1987 | Andren et al. | 375/130 |
| 5,894,494 | 4/1999 | Davidovici | 375/150 |
| 5,943,329 | 8/1999 | Ohgoshi et al. | 370/335 |

*Primary Examiner*—Chi H. Pham
*Assistant Examiner*—Khai Tran
*Attorney, Agent, or Firm*—David L. Smith

[57] ABSTRACT

A receiver for a spread spectrum communication system is disclosed in which a transmitter transmits a data signal to a receiver includes a memory for storing digital representation of the data signal received by the receiver. A memory input addressing unit defines a circulating data window. A first ring shift register circulates a first set of components of a spreading code. A second ring shift register circulates a second set of components of a spreading code. A selector selects one of the first set of components or the second set of components as selected components of the spreading code and an adder receives as inputs digital representations of the data signal from the circulating data window and the selected components of the spreading code. The adder provides an output that is the dot product of the inputs.

15 Claims, 11 Drawing Sheets

| Z | Z | • | • | • | • | Z | CARRY 1 | 842 |
|---|---|---|---|---|---|---|---|---|
| 0 | • | • | • | • | • | • | SUM  1 | 840 |
| Z | Z | • | • | • | • | Z | CARRY 2 | 842 |
| 0 | • | • | • | • | • | • | SUM  2 | 840 |
| 0 | • | • | • | • | • | • | INTERMEDIATE CARRY | |
| Z | Z | • | • | • | • | Z | INTERMEDIATE SUM | |
| 0 | • | • | • | • | • | • | BITS NOT ADDED | |
| • | • | • | • | • | • | • | SUM | 950 |
| • | • | • | • | • | Z | Z | CARRY | 960 |

Z = ZERO

FIG. 10

|   |   |   |   |   |   |   |   |   | Label | # |
|---|---|---|---|---|---|---|---|---|---|---|
|   |   | · | · | · | · | · | Z | Z | CARRY INPUT | 950 |
|   |   | · | · | · | · | · | · | · | SUM INPUT | 960 |
| Z | · | · | · | · | · | Z | Z | Z | CARRY OUTPUT | 1050 |
| 0 | · | · | · | · | · | · | · | · | SUM OUTPUT | 1060 |

FIG. 11

|   |   |   |   |   |   |   |   | Label |   | # |
|---|---|---|---|---|---|---|---|---|---|---|
| Z | · | · | · | Z | Z | Z |   | CARRY | 1 | 1050 |
| 0 | · | · | · | · | · | · |   | SUM | 1 | 1060 |
| Z | · | · | · | Z | Z | Z |   | CARRY | 2 | 1050 |
| 0 | · | · | · | · | · | · |   | SUM | 2 | 1060 |
| · | · | · | · | Z | Z | · |   | INTERMEDIATE CARRY | | |
| Z | · | · | · | · | · | · |   | INTERMEDIATE SUM | | |
| Z | · | · | · | Z | Z |   |   | BITS NOT ADDED | | |
| · | · | · | · | · | · | · |   | SUM | | 1160 |
| · | · | · | · | Z | Z | Z |   | CARRY | | 1150 |

FIG. 12

|   |   |   |   |   |   |   |   |   |   | Label | # |
|---|---|---|---|---|---|---|---|---|---|---|---|
| · | · | · | · | · | · | Z | Z | Z |   | CARRY | 1150 |
| · | · | · | · | · | · | · | · | · |   | SUM | 1160 |
| · | · | · | · | · | Z | Z | Z | Z |   | CARRY | 1250 |
| · | · | · | · | · | · | · | · | · | · | SUM | 1260 |

FIG. 13

| | | | | | | | | | | | |
|---|---|---|---|---|---|---|---|---|---|---|---|
| Z | • | • | • | • | Z | Z | Z | Z | | CARRY 1 | 1250 |
| 0 | • | • | • | • | • | • | • | • | | SUM 1 | 1260 |
| Z | • | • | • | • | Z | Z | Z | Z | | CARRY 2 | 1250 |
| 0 | • | • | • | • | • | • | • | • | | SUM 2 | 1260 |
| | • | • | • | • | Z | Z | Z | Z | | INTERMEDIATE CARRY | |
| Z | • | • | • | • | • | • | • | • | | INTERMEDIATE SUM | |
| 0 | • | • | • | • | • | • | • | | | BITS NOT ADDED | |
| | • | • | • | • | • | • | • | • | • | SUM | 1350 |
| | • | • | • | • | Z | Z | Z | Z | | CARRY | 1360 |

FIG. 14

| | | | | | | | | | | | |
|---|---|---|---|---|---|---|---|---|---|---|---|
| • | • | • | • | • | Z | Z | Z | Z | | CARRY | 1360 |
| • | • | • | • | • | • | • | • | • | | SUM | 1350 |
| • | • | • | • | Z | Z | Z | Z | Z | | CARRY | 1460 |
| • | • | • | • | • | • | • | • | • | | SUM | 1450 |

| | | | | | | | | | | | | |
|---|---|---|---|---|---|---|---|---|---|---|---|---|
| Z | • | • | • | • | Z | Z | Z | Z | Z | | CARRY | 1460 |
| 0 | • | • | • | • | • | • | • | • | • | | SUM | 1450 |
| Z | • | • | • | • | Z | Z | Z | Z | Z | | CARRY | 1460 |
| 0 | • | • | • | • | • | • | • | • | • | | SUM | 1450 |
| • | • | • | • | • | • | • | • | • | • | | INTERMEDIATE CARRY | |
| Z | • | • | • | • | • | • | • | • | • | | INTERMEDIATE SUM | |
| 0 | • | • | • | • | Z | Z | Z | Z | Z | | BITS NOT ADDED | |
| • | • | • | • | • | • | • | • | • | • | | SUM | 1550 |
| • | • | • | • | • | • | • | • | • | Z | Z | CARRY | 1560 |

DIGITAL COMMUNICATION SYSTEM FOR HIGH-SPEED COMPLEX CORRELATION

Priority of U.S. Provisional Application Ser. No: 60/034,812, filed Dec. 31, 1996, is hereby claimed.

TECHNICAL FIELD

This invention relates to digital communication technology and in particular to a technique useful in a receiver for correlating a generated, known sequence with received signal samples to determine the received signal samples in a multi-chip data sequence.

BACKGROUND OF THE INVENTION

Various standards have been developed for radio transmission or communication. They fall into several categories including frequency division multiple access (FDMA), time division multiple access (TDMA), and code division multiple access (CDMA). Under FDMA communications, a communications channel is a single radio frequency band into which a signal transmission power is concentrated. Interference with adjacent channels is limited by the use of band-pass filters which only pass signal energy within the specificed frequency band. Each channel is assigned a different frequency and system capacity is limited by the available frequency range and channel bandwidth.

Under TDMA communications, a channel consists of a time-slot in a periodic group of time intervals over a single frequency. Each period of time slots is defined as a frame. A signal's energy is confined to one of the time slots. Adjacent channel interference is limited by the use of a synchronization element that only captures signal energy at the proper time.

Under CDMA communications, sometimes referred to as spread-spectrum communications, signals are permitted to overlap in both time and frequency. Thus, all CDMA signals share the same frequency spectrum. In both the frequency and time domains, the multiple access signals appear to be superimposed on each other. The informational data stream to be transmitted is impressed upon a much higher rate data stream known as a signature sequence. The signature sequence data are typically binary. The signature sequence is often generated with a pseudo-noise process that appears random but can be replicated in a receiver. The informational data stream and the high bit rate signature sequence stream are combined. The combination of the higher bit rate signal with the lower bit rate data stream is defined as coding or spreading the informational data stream signal. Each informational data stream or channel is allocated a unique one of a set of orthogonal spreading codes that is used in de-spreading the informational data stream received by the receiver. In this manner, a receiver can extract information from the informational data stream that is intended for it from the higher rate informational data stream which includes information intended for all receivers.

Several CDMA standards have been proposed. One such standard is IS-95 adopted for use in the U.S. for cellular telephony. To determine when a signal is transmitted, and to synchronize the reception and processing of a transmitted signal, IS-95 specifies the use of a search finger which uses a correlator to correlate a known portion of the IS-95 pilot epoch with the sampled received signal. The pilot epoch is the time interval over which the pseudo noise sequence repeats. The known portion of the IS-95 pilot epoch is the first 64 chips output from the in-phase and quadrature pseudo-noise generators subsequent to the rollover state. The state at which the in-phase sample sequence and quadrature sample sequence pseudo-noise generators have all zeros in the stages and the first stage is forced to a one prior to the next state transition. The 80 milliseconds after the long code generator is initialized with a value received from the base station on a different channel than the received data. The beginning of the pilot epoch is the rollover state. The pilot channel is the zero Walsh channel. An exclusive OR of the zero Walsh channel with the in-phase and quadrature pseudo-noise sequence leaves the pilot sequence unaltered. There is no data on the pilot channel. A unique sequence of a predetermined number of bits for each transceiver, sometimes called a long code sequence, that is used to spread data transmitted by the transceiver and to de-spread data received by the transceiver. The pilot sequence is a sequence of a known number of bits, transmitted at a predetermined clock rate specified by the standard. Each phase transition transmitted or received is defined as a chip, which is a fraction of a symbol due to the spreading of the data. In IS-95 for example, 64 chips represent one symbol.

Communication systems are often subject to multipath distortion in which a transmitted signal can arrive at a receiver at multiple times, appearing to be a multiplicity of received signals. Each of the multiplicity of received signals may have variations in parameters relative to the transmitted signal, such as different delays, gains and phases. Relative motion between a transmitter and receiver further contribute to variations in the received signal. The receiver must reliably extract the transmitted signal from the multiplicity of received signals. A type of receiver particularly well suited for reception of multipath spread spectrum signals is a RAKE receiver. A RAKE receiver is comprised of "fingers" which optimally combine in the receiver the signals received from the various paths. The RAKE receiver can be analogized to a matched filter, where the path gains of each "finger," like the taps of a matched filter, need to be estimated to construct the RAKE receiver to accurately detect a received transmitted signal. Since a transmitted signal is subject to many types of distortion as it passes through a channel to a receiver (multipath effects, Rayleigh fading, Doppler shift, etc.), the receiver must estimate the path gains utilizing the transmitted signal as distorted at the receiver. Thus, the detected received signal will only be as good as the path gain estimation "finger" in the RAKE receiver.

U.S. Pat. Nos. 5,448,600; 5,442,661; 5,442,627; 5,361,276; 5,327,455; 5,305,349; and 5,237,586, the disclosures of which are hereby incorporated by reference, each disclose a rake receiver. In rake receivers, for each fractional chip increment, a correlation with the pilot epoch is performed, which may be represented using the complex conjugate of the expected sequence, $x_r(n)+x_i(n)$, as $$cc_r(n) = \sum_{m=0}^{63} x_r(m) \cdot y_r(m+n\tau) + \sum_{m=0}^{63} x_i(m) \cdot y_i(m+n\tau) \quad (1)$$

and $$cc_i(n) = \sum_{m=0}^{63} x_r(m) \cdot y_i(m+n\tau) - \sum_{m=0}^{63} x_i(m) \cdot y_r(m+n\tau) \quad (2)$$

where:
  n and m are counters
  $cc_r(n)$ are the real components of the cross correlation
  $cc_i(n)$ are the imaginary components of the cross correlation y is the sampled received signals x is the reference sequence sequence τ is a fractional chip Thus, as can be seen from equations (1) and (2), four real correlations are performed in the process of performing one complex correlation.

Acquisition mode occurs when a transceiver is trying to determine whether there is a pilot signal present that is intended for all receivers. In acquisition mode, the search finger must search through all fractional chip offsets of the pilot epoch in order to locate a signal, should one be present, intended for a particular receiver.

Data detection mode occurs when the transceiver has identified that there is a signal present in the signature sequence intended for that particular transceiver. In the data detection mode, there are several sub modes. The sub modes include a paging data mode, a synchronization data mode, and a traffic mode. During the paging data and traffic modes, the search finger must scan for other signals over a limited search range relative to the time of arrival of the first 64 or 128 chips following the all-zero state of the base station pilot epoch. If the search function is to be accomplished in real time, using a 64 chip matched filter, the number of accumulators can be calculated as: (64 chips) times (8 offsets per chip) times (four real correlations per complex correlation). 2048 accumulators would be required. Since it is not practical to provide 2048 accumulators, prior art correlators have accepted a trade-off between the amount of hardware provided and the time required to complete the search function by implementing multiple time offset correlations such as by operating multiple serial accumulators in parallel.

If real-time correlation is not employed, the time penalty incurred can be calculated. Defining an epoch to be the duration of the entire pilot sequence (e.g., for IS-95 $2^{15}$ chips at 1.2288 MHz or 26.66 milliseconds), and assuming an ideal scenario with 100% probability of detecting the presence of a pilot signal with no Doppler frequency offset and 0% probability of no false detection of a pilot signal, the maximum search time is given by equation (3).

$$T_{search} = \frac{L_{corr} \times N_{samples} \times 4}{N_{accum}} \times \text{Sequence Time} \quad (3)$$

where:

$T_{search}$ is the maximum time to complete the search $L_{corr}$ is correlation length (typically 64 or 128 for IS-95)

$N_{samples}$ is the number of sample time offsets per chip $N_{accum}$ is the number of serial accumulators 4 is the number of real multiplies for each complex multiply, and Sequence time is the duration of the pilot sequence (26.66 ms for IS-95)

It can be seen from equation (3) that the maximum time to complete the search for the reference sequence at all possible time offsets is directly proportional to the correlation length, number of samples and sequence time, and inversely proportional to the number of accumulators.

SUMMARY OF THE INVENTION

In accordance with the present invention, a receiver for a spread spectrum communication system in which a transmitter transmits a data signal to a receiver includes a memory for storing digital representation of the data signal received by the receiver. A memory input addressing unit defines a circulating data window. A first ring shift register circulates a first set of components of a spreading code. A second ring shift register circulates a second set of components of a spreading code. A selector selects one of the first set of components or the second set of components as selected components of the spreading code and an adder receives as inputs digital representations of the data signal from the circulating data window and the selected components of the spreading code. The adder provides an output that is the dot product of the inputs vectors.

BRIEF DESCRIPTION OF THE DRAWINGS

FIG. 10 is a dot representation of the inter-stage operation between levels C and D in FIG. 5;

FIG. 11 is a dot representation of the addition in an adder in level D of FIG. 5;

FIG. 12 is a dot representation of the inter-stage operation between levels D and E in FIG. 5;

FIG. 13 is a dot representation of the addition in an adder in level E of FIG. 5;

FIG. 14 is a dot representation of the inter-stage operation between levels E and F in FIG. 5;

DETAILED DESCRIPTION

Figure 1:
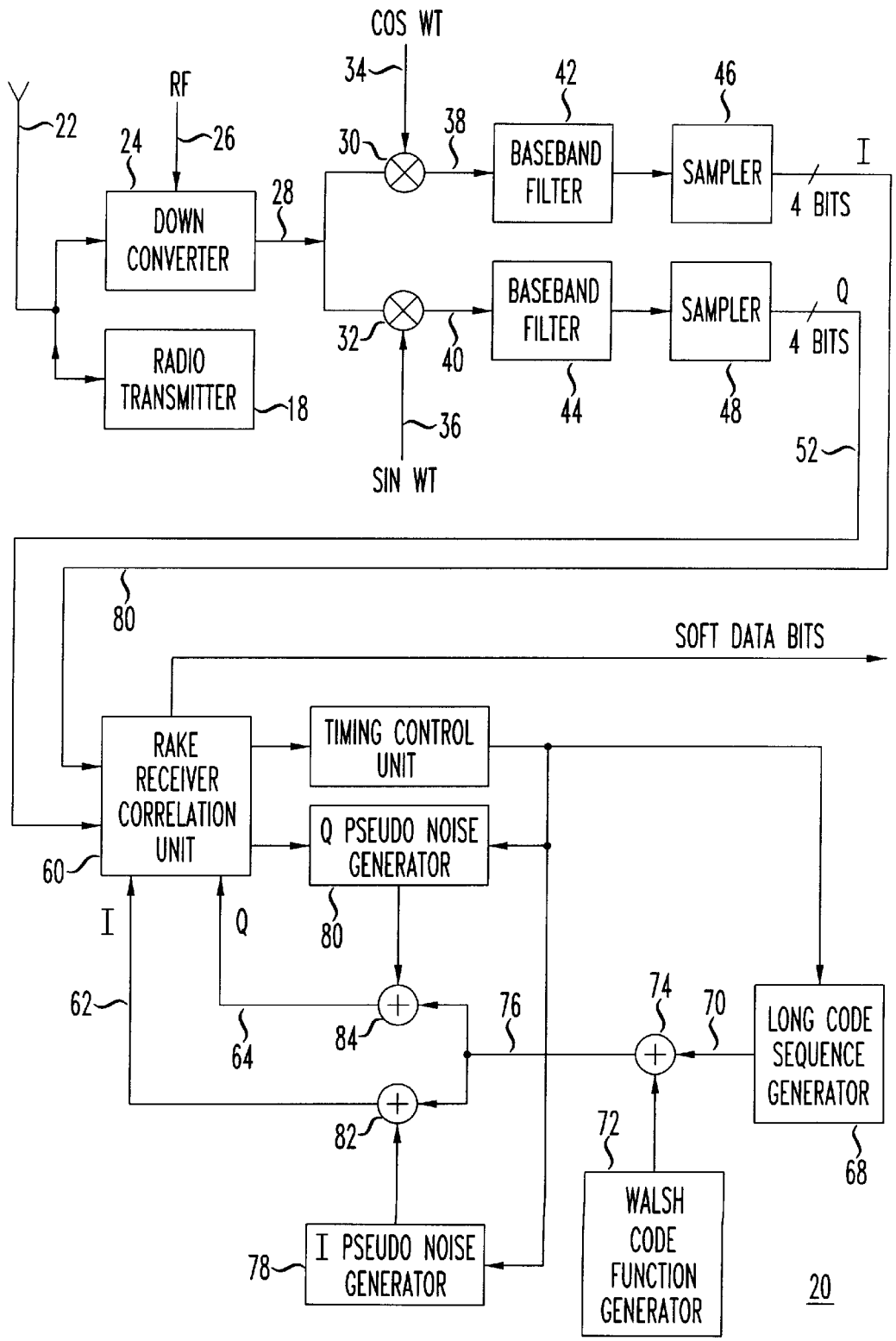
FIG. 1 is a block diagram of a communication system including a rake receiver having a correlator in accordance with the present invention.

An illustrative embodiment of the invention is shown as a block diagram of a communication system 20 in FIG. 1. The communication system could represent, for example, a telephone handset in a cellular telephone system, or a base station in a cellular telephone system. On the transmit side of the communication system, transmitter 18 is shown coupled to antenna 22. On the receive side of the communication system 20, antenna 22 receives a signal from a base station and provides the signal to down-converter 24 where the received signal is mixed with an RF signal 26 and filtered. The output of down-converter 24 is an intermediate frequency signal 28. The intermediate frequency signal 28 is provided to first and second intermediate frequency mixers, 30 and 32. The first and second intermediate frequency mixers also receive a sinusoidal input, 34 and 36. The sinusoidal inputs 34 and 36 have a quadrature (i.e., 90°)

phase separation, such as sign and cosign. The respective outputs from mixers 30 and 32 are the base-band in-phase (I) and quadrature (Q) signals 38 and 40. Signals 38 and 40 are filtered by filters 42 and 44, then digitized by samplers 46 and 48. For the IS-95 standard, the sampling rate of signals 38 and 40 is 9.8304 megahertz. Sampled in-phase signal 50 output from sampler 46 is a digital representation of the filtered in-phase signal 38 with, for example, four-bit resolution. Similarly, sampled quadrature signal 52 output from sampler 48 is a digital representation of the filtered quadrature signal 40 with, for example, four-bit resolution.

The sampled in-phase signal 50 and sampled quadrature phase signal 52 are provided to rake receiver correlation unit 60. Rake receiver correlation unit 60 also receives digital in-phase and quadrature signals 62 and 64 and timing signal 66 extracted from the received data.

Pilot detect signal 66 from the signal searching function on the rake receiver is provided to a timing and control unit, which is used to start the pilot spreading sequence generator 68 to time the generation of a known pilot sequence 70, outputted, for example, at 1.2288 MHz for IS-95.

In-phase and quadrature pseudo-noise generators 78 and 80 also receive the timing signal 66 and generate pseudo-random noise, for example, at 1.2288 megahertz for IS-95, which is combined respectively in exclusive OR gates 82 and 84 with combined signal 76. The purpose of pseudo-random noise is to replicate the base station transmit process and generate matched filters for the data detection and acquisition processes. Signals 62 and 64 are used in rake receiver 60 to replicate the base station process. The output of exclusive OR gate 82 is in-phase signal 62. The output of exclusive OR gate 84 is quadrature signal 64. The long code sequence represents an encryption code with an extremely long epoch. It outputs a random sequence of bits at 1.2288 MHz. It's output is decimated down to 19.2 KHz and exclusive OR-ed with the Walsh code vectors to replicate the base station encryption process. The long sequence 70 is combined with a Walsh function generated by Walsh code function generator 72 in exclusive OR 74 to produce a combined signal 76 at the output of exclusive OR 74.

Rake receiver correlation unit 60 processes the inputs it receives and outputs soft data bits 86 extracted from the signature sequence.

Figure 2:
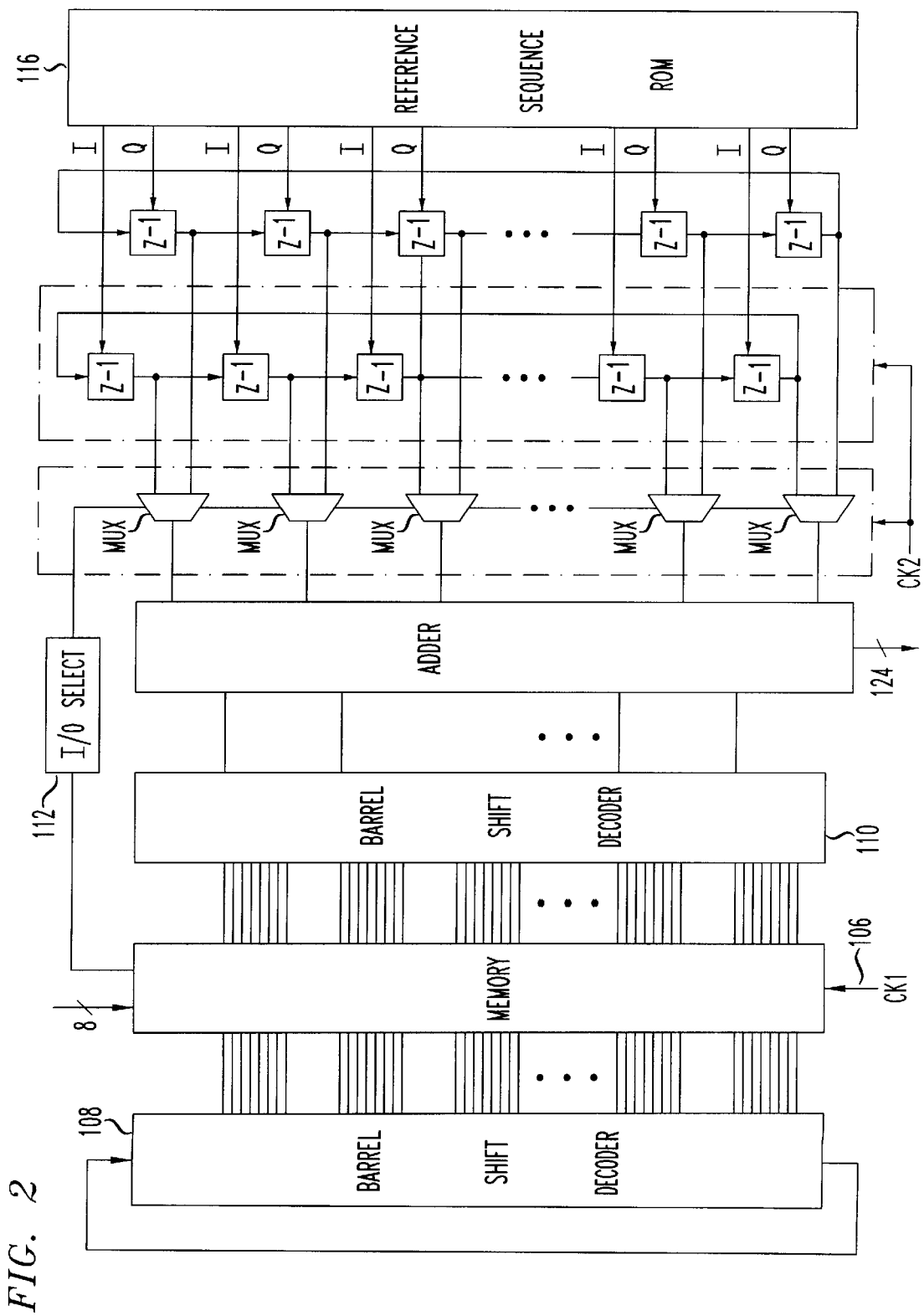
FIG. 2 is a schematic diagram of a portion of the rake receiver shown in FIG. 1.

FIG. 2 provides an overview of a portion of a rake receiver employing the present invention. Barrel shift decoder 108 controls circular shifting of a data window, and thus establishes which byte of memory 104 newly received in-phase and quadrature data are written into. Barrel shift decoder 110 coordinates selection of in-phase or quadrature components of the stored receive data, in conjunction with I/Q select 112, for use in the correlation calculations. Adder 114 combines the data components from memory 104 with components provided from reference sequence 116 as selected in conjunction with I/Q select 112, first shift register 116, second shift register 118 and multiplexers 122. The adder output is temporarily stored while each of four real correlations are completed. The four real correlations are completed before newly received in-phase and quadrature components are stored.

The received signals, sampled in-phase signal 50 and sampled quadrature phase signal 52, are stored in memory 104. Memory 104 in the illustrative embodiment has 512 bytes, with each byte containing a 4-bit sampled in-phase signal 50 and a 4-bit sampled quadrature phase signal 52. Storing both the in-phase signal 50 and the quadrature signal 52 in a single byte is a matter of convenience; the invention is not limited thereto. In a preferred embodiment, memory 104 is addressed circularly, so as to appear to be endless. Memory 104 is loaded sequentially with complex samples, eight in the illustrative embodiment, or more generally n samples per chip, at a first clock rate 106. For an IS-95 implementation, the first clock rate is 9.8304 megahertz and n is 8 samples per chip. Thus, in memory 104, when incrementing from one bit to the next, increments (or decrements) the search by 1/8 (more generally 1/n) of a chip.

Upon receipt of a new sample of in-phase and quadrature data, the oldest sample of in-phase and quadrature (complex sample) of data stored in memory 104 is overwritten by the most recently received complex sample. The data window being processed is circularly shifted by one complex sample location, a byte in the illustrated embodiment, with the most recently received complex sample in a reference position, such as one less than the length of the memory, and the oldest remaining complex samples in an ending position, such as zero. Employing circular addressing of memory 104 and circularly shifting the data window, effectively shifts the data window in time and effectively shifts the complex samples stored in memory 104 without actually rewriting the complex samples stored in memory 104.

The input addressing unit for circularly addressing memory 104 is barrel shift decoder 108. Other types of decoders could be used. Barrel shift decoder 108 is clocked at the same clock rate as the rate at which data is being received. For example, implementing IS-95 barrel shift decoder 108 would be clocked at 9.803 megahertz. Barrel shift decoder 108 establishes a moving data window that circularly shifts the starting and ending references of the data window each occurrence of newly received in-phase and quadrature samples. The new in-phase and quadrature samples overwrite the oldest in-phase and quadrature samples in memory 104. In a preferred embodiment, barrel shift decoder 108 has the same number of bits as memory 104 has locations for a complex sample (in the illustrative embodiment each location is a byte), for example 512 bits. One bit in barrel shift decoder 108 is set to a first binary value, such as 1, and all other bits are set to a second binary value such as 0.

The output addressing unit for circularly addressing memory 104 is barrel shift decoder 110. In a preferred embodiment, barrel shift decoder 110 has every $n^{th}$ bit set to a first binary value, such as 1, and all other bits set to a second binary value such as 0. For IS-95 implementation, n is 8.

The output from memory 104 is selected by I/Q select 112 as in-phase samples comprising the upper four (more generally n/2) bits of each byte, or quadrature samples comprising the lower four (more generally n/2) bits from each byte of a memory location of memory 104. The outputs from memory 104 are provided to adder 114. The outputs from barrel shift decoder 110 and hence from memory 104, are a vector of in-phase or quadrature components of the received signal samples. Adder 114 also receives as inputs the in-phase or quadrature reference sequence, also a vector, from reference sequence register 116. Adder 114 computes the vector dot product of the in-phase or quadrature vector of the receive signal samples received from barrel shift decoder 110 and the in-phase or quadrature vector of the reference sequence received from reference sequence register 116. The output 124 from adder 114 is stored temporarily in one of four registers 160, 162, 164 and 166, shown in FIG. 6.

A one-bit-per-sample reference sequence, or matched filter, is stored in reference sequence register 116. Reference sequence register 116 contains both the in-phase and quadrature reference sequences. Each bit of in-phase and quadrature reference sequence is either a plus one or a minus one as represented by a logic one and a logic zero, respectively. The Nyquist rate for the complex signal is one sample per chip for each in-phase term and quadrature term, and thus the complex signal can be uniquely defined as two independent sequences of plus and minus ones. The quadrature term is the negative complex conjugate of the in-phase term.

First and second shift registers 118 and 120 are parallel-in, parallel-out, multiple stage shift registers. Upon start-up, the in-phase components of the reference sequence are provided as parallel inputs to first shift register 118 and the quadrature components of the reference sequence are provided as parallel inputs to second shift register 120. The in-phase and quadrature reference sequences are circularly shifted, respectively by first shift register 118 and second shift register 120, at a second clock rate 132 (1.2288 megahertz for IS-95), one shift for the elapsed time of every 8 received complex samples (more generally for every n samples) of new in-phase and quadrature samples written into memory 104. The in-phase and quadrature reference sequences are circularly shifted, corresponding to the circular addressing of memory 104, to align elements of the in-phase and quadrature reference sequences with the appropriate in-phase and quadrature samples stored in memory 104 to achieve each of the four real correlations. For each shift position of the reference sequence, barrel shifter 110 will encode to the adder tree eight different samples from each sample group, representing each of eight fractional delays. Shifting the in-phase and quadrature reference sequences at the second clock rate 132 consumes less power and less time than shifting all of the complex samples stored in memory 104 at the first clock rate 106. Concurrently with this process, new complex samples are written to memory 104, the adder output 124 is changed only as a function of the newest complex samples input to the memory passed through to adder 114.

Multiplexers 122 having select inputs controlled by I/Q select 112 determines which components, the in-phase or quadrature components, of the reference sequence are provided to adder 114. I/Q select 112 also determines whether in-phase or quadrature received signal samples are obtained from memory 104 and provided to adder 114.

The data detection and finger timing tracking modes require a new matched filter each time period represented by 64 chips. New complex samples overwrite the oldest complex samples in memory 104 and the correlation is evaluated only when the reference vector alignment register 155, shown in FIG. 3, is properly positioned.

For finger timing tracking it is common to employ three correlations, in a periodic manner, for each finger. The three correlations are referred to as "early", "on-time", and "late" correlations. The on-time correlations are performed at the expected times of arrival of the three signal paths (or 6 for soft handoff mode) indicated by the acquisition routine. The early and late correlations are performed at fractional chip times before and after the on-time correlations. Thus, there are nine (18 for soft handoff mode) correlations performed, one for each 64-chip interval, to calculate a timing correction value at a rate of 19.2 KHz for IS-95.

Figure 3:
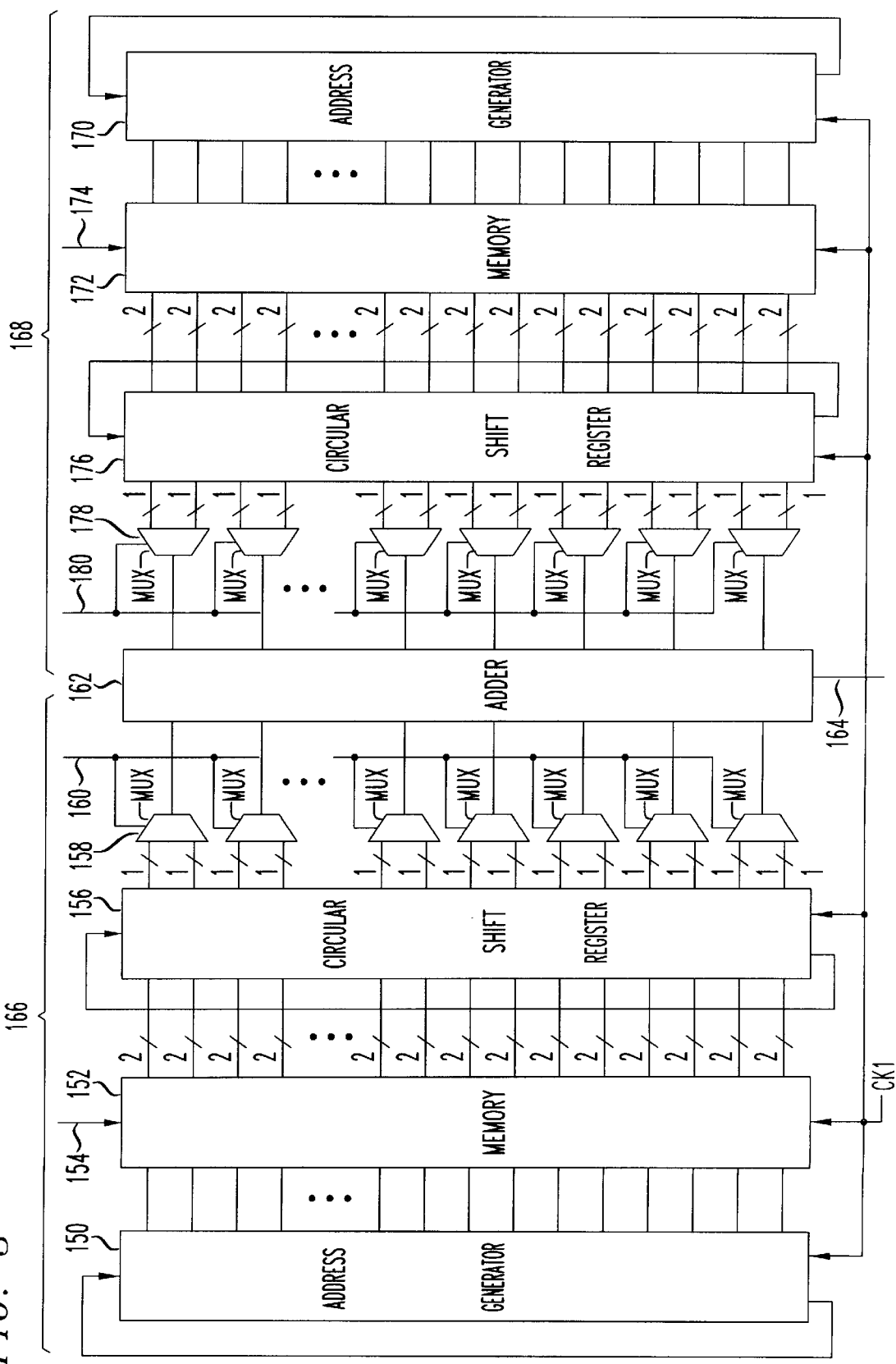
FIG. 3 is a schematic diagram of a tracking correlation reference generator circuits.

The tracking correlation reference vector generator is shown in FIG. 3. A first and second tracking correlation reference vector generator circuits 166 and 168 are shown in FIG. 3. In first tracking correlation reference vector generator circuit 166, circular address generator 150 is a circular address generator, similar to barrel-shift decoder 108. Address generator 150 contains one bit of a first state and the remaining bits of a second state. Address generator 150 is, in the illustrative example, 64 bits long having a bit at one location set to one and bits at all other locations set to zero. Thus, circular address generator 150 has a circulating one which allows new data entering memory 152 at 154 to be written at a rate of CK2, which is 1.2288 MHz in the illustrative example. Memory 152 is a 64 by 2 bit memory that contains the in-phase and quadrature reference sequences. Each of the in-phase and quadrature reference sequences are a single bit that is either a one or zero. Memory 152 is similar to memory 104 of FIG. 1.

The in-phase and quadrature reference sequences are shifted in parallel out of memory 152 into circular shift register 156. Both the in-phase and quadrature reference sequences are shifted out of memory 152 simultaneously.

The data input to memory 152 at 154 is a serial input of the pilot epoch employed in the nine correlations. The pilot epoch is provided as an input because it is not Walsh modulated and it is a strong signal. In the illustrative embodiment, for each clock cycle of clock CK2, circular shift register 156 shifts one unit or chip. In this manner, the bits of the reference sequence will be aligned with corresponding taps of the matched filter.

With circular shift register 156 filled and circularly shifting, the multiplexers 158 controlled by select input 160 coupled to I/Q select 112 select either the in-phase or quadrature reference sequence from circular shift register 156 to adder 162. Other inputs to adder 162 include the same 64 outputs from barrel shift decoder 110 provided to adder 114 (shown in FIG. 2). The 64 outputs from barrel shift decoder 110 are a vector of in-phase or quadrature components of the received signal samples. These are the same vector components from memory 104 that the searcher uses. Adder 162 combines the inputs and forms a sum output 164. While adder 162 is a different adder than adder 114 shown in FIG. 2, it may have the same adder structure. In operation, once three main fingers (early, on-time, and late) are detected by searching the received signal with a fixed reference, the received signal is replicated by clocking into memory 152 the pilot sequence epoch in a circular fashion, beginning where the received data memory 106 input address pointer points to the first group of eight values of the receive signal samples data window that corresponds to the first early finger receive data vector. This synchronizes bits of the in-phase and quadrature reference sequence with the sequence of received complex samples arriving on the early finger. Once the pilot epoch sequence is aligned and synchronized with the first "early" finger, the in-phase and reference sequence vectors are loaded in parallel from memory 152 to circular shift register 156 each time the received data memory input address pointer points to the first group of eight received complex signal samples in the data window that corresponds to the first early finger receive data vector.

The in-phase and quadrature reference sequence are loaded into memory 152 and the I/Q select 112 enables the inputs to adder 162 for the first of nine desired or valid correlation times, as indicated by the initial search vector. Circular address generator 150 barrel shifts to allow correlations at any of the possible subsequent arrival times in the 23 chip time interval following the first finger (23×8 time intervals in all) while memory 152 continues to receive pilot epoch sequence bits and store them in accordance with the location identified by circular address generator 150 to prepare for the next parallel load from memory 152 into circular shift register 156 64 chips after the previous parallel load. This parallel load occurs repetitively each 64 chips. The inputs to adder 164 are enabled at eight additional times in the 23 chip interval to complete the set of nine correlations.

In the soft hand-off mode, two base station "cells" must be monitored. All cells use the same pseudo-noise sequence, however, with different time offsets. In order to use the same adder 162 for tracking both base-station pilot signals, a portion of the tracking correlation reference vector generator circuit 166 depicted in FIG. 3 may be duplicated. Address generator 150, memory 152, circular shift register 156 and multiplexers 158 would be duplicated. The memory 172 of the second tracking correlation reference generator circuit 168 will have as input, a delayed version of the pseudo-noise sequence provided to memory 152 of the first circuit 166. The outputs of the circular shift register 156 from the first circuit are multiplexed at 158 into adder 162 during the first half of the 64 chip interval to calculate the nine tracking correlations for the first pilot signal. During the second half of the 64 chip interval, the outputs from the circular shift register 176 of circuit 168 are multiplexed at 178 into or enabled to adder 162 to calculate the nine tracking correlations for the second pilot signal.

Circular address generator 170 is a 64 bit circular generator having one location that is a one and 63 locations that are zeros. Circular address generator 170 identifies in the location having a one the location of memory 172 into which the new data is written. The data inputed to memory 166 is the complex pilot sequence modulated exclusive-ored with a 64 chip Walsh sequence in a repetitive manner to mirror the transmit process for a particular Walsh channel. These inputs are provided at 174. The modulated pilot epoch in-phase and quadrature sequence are provided in parallel to circular shift register 176. Circular shift register 176, like memory 172 and address generator 170 are clocked by clock CK2. Circular shift register 176 provides the in-phase and quadrature modulated pilot sequence to multiplexers 178 which are controlled by select input 180 coupled to I/Q select 112. Multiplexers 178 select either the in-phase or quadrature modulated pilot sequence vectors as inputs to adder 162 alternately with multiplexers 158. The other inputs to adder 162 are as stated above the vector of in-phase or quadrature components of the received signal samples (not shown). Adder 162 performs a correlation and provides output 164.

For each received data interval which equals 1/9.83 MHz seconds, four correlation outputs 164 that are needed to complete a full complex correlation are gathered and stored at a rate four times that of the 9.83 MHz sample rate. The tracking correlation outputs 164 are combined in a manner described by equations 1 and 2 to calculate the real and imaginary correlation components. These components are squared and summed to calculate the squared magnitude of the correlations which are later used to determine appropriate timing and radio frequency adjustments. Before squaring and summing, the complex values of the on-time correlations are stored to calculate phase and gain estimates used to compensate data correlations. The data correlation outputs 164 are processed in the same manner to produce a complex correlation value. The real and imaginary components of the full complex correlation value are individually scaled with separate constants calculated from the "on-time" tracking correlations. The resulting products are summed to create a soft symbol for input to de-interleaver and Viterbi decoding.

Figure 4:
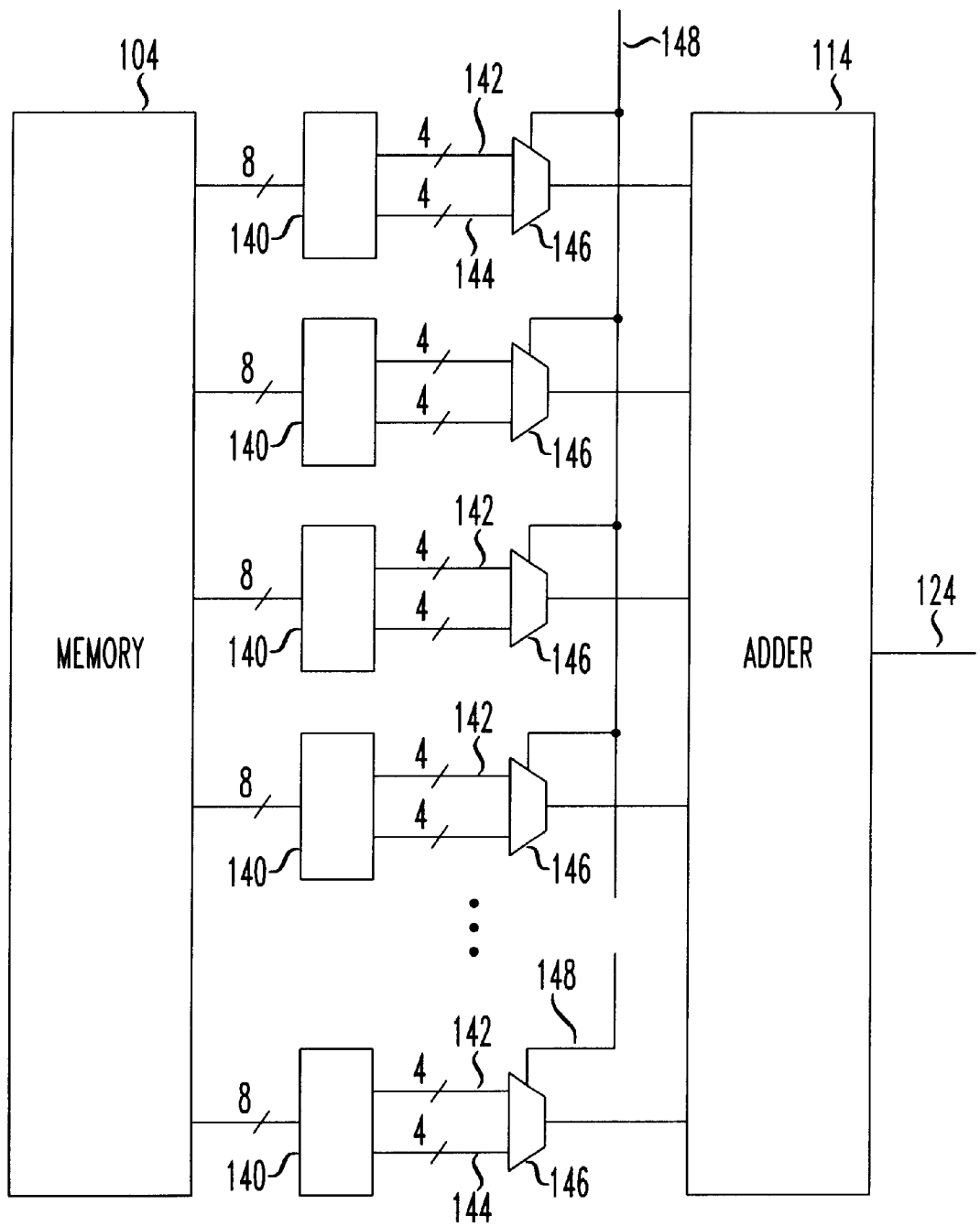
FIG. 4 is a schematic diagram of an inject circuit.

An inject circuit is shown in FIG. 4 that determines where in memory 104 to store newly received in-phase and quadrature signals 50 and 52, commensurate with barrel shift decoder 108 defining a circular window. Barrel shift decoder 108 has one-bit set to a first binary value, such as one, and all other bits set to a second binary value such as zero, such that only one output of barrel shift decoder is high. The high output from barrel shift decoder 108 causes newly received in-phase and quadrature signals 50 and 52 to be written to a location of memory 104 defined by the circular window reference of barrel shift decoder 108 where the output of barrel shift decoder 108 is set to the first binary value, such as one.

As shown in FIG. 4, the output from memory 104 is sorted into two banks. The output from memory 104 is sorted into two banks due to the manner in which the in-phase signal samples 50 and the quadrature signal samples 52 were stored in a single byte of a register of memory 104. Data read out of memory 104 is sorted by parallel-in, parallel-out shift registers 140 into a first bank 142 of in-phase samples comprising the upper four bits (more generally n/2 bits) of each byte and a second bank 144 of quadrature samples comprising the lower four bits of each byte (more generally n/2 bits). Multipliers 146, as controlled by select input 148, select the first or second bank of samples as inputs to adder 114. Select input 148 is controlled by I/Q select 112. Other inputs to adder 114 are not shown in FIG. 4.

Any known hierarchical adder tree could be used to calculate the vector dot product of the in-phase or quadrature signal samples received from memory 104 and the in-phase or quadrature components of the reference sequence from reference sequence generator 116. An adder for calculating vector dot products is disclosed in U.S. Pat. No. 4,884,232 the disclosure of which is hereby incorporated by reference.

Figure 5:
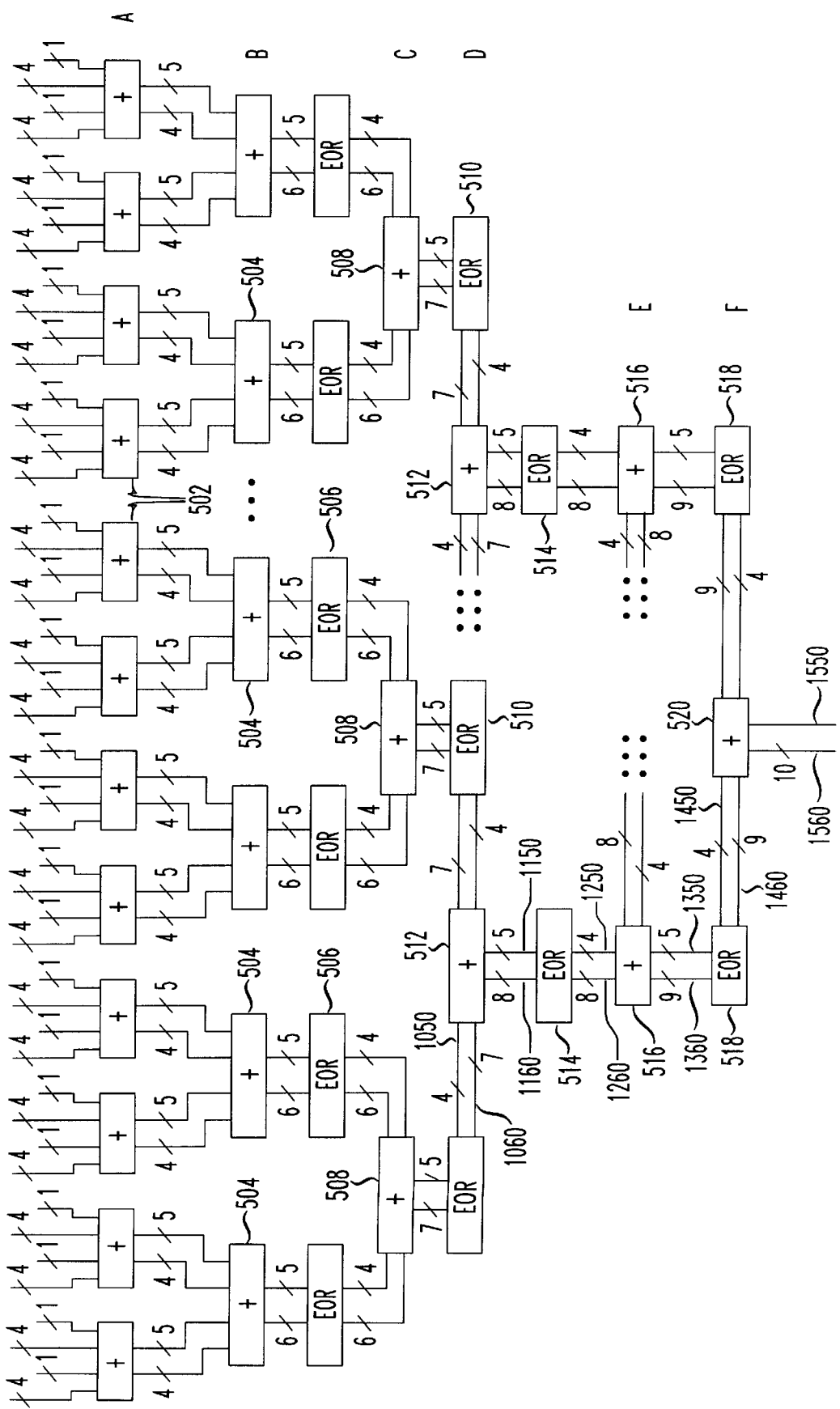
FIG. 5 is a schematic diagram of the adder shown in FIG. 2, in greater detail.

A preferred embodiment of adder 114 is shown in greater detail in FIG. 5. Adder 114 receives the vectors of in-phase or quadrature signal samples, and the in-phase or quadrature components of the reference sequence and calculates a dot product representing a correlation of the input vectors. The hierarchal adder shown in FIG. 5 of the illustrative embodiment has six levels designated A–F. Level A comprises thirty-two adders, each receiving two of the in-phase or quadrature signal samples from memory 104, and two corresponding in-phase or quadrature components of the reference sequence from reference sequence generator 116 as control signals to determine whether to add or subtract the signal samples received from memory 104. For example, a control signal that is a zero may indicate addition while a control signal that is a one may indicate subtraction.

Level A of adder 114 receives sixty-four 4-bit numbers and sixty-four 1-bit control signals as described above and reduces the inputs to thirty-two carry signals, each five bits and thirty-two sum signals each four bits. Level B receives as inputs thirty-two sum signals and thirty-two carry signals output from level A and reduces the inputs to sixteen sum signals and sixteen carry signals as outputs. Level C receives as inputs sixteen sum signals and sixteen carry signals output from level B and reduces the inputs to eight sum signals and eight carry signals as outputs. Level D receives as inputs eight sum signals and eight carry signals output from level C and reduces the inputs to four sum signals and four carry signals as outputs. Level E receives as inputs four sum signals and four carry signals output from level D and reduces the inputs to two sum signals and two carry signals as outputs. Level F receives as inputs two sum signals and two carry signals output from level E and reduces the input to a sum signal and a carry signal as outputs.

Each adder in level A receives two 4-bit in-phase or quadrature signal samples and two associated 1-bit control signals. The signal samples and control signals are illustrated as the inputs to level A adders in FIG. 5, and also in the dot representation of FIG. 6. The addition represented in FIG. 6 occurs in thirty-two adders 502 at level A in adder 114 of FIG. 5.

If a control signal indicates that the associated in-phase or quadrature signal sample should be subtracted, the bits representing the in-phase or quadrature signal sample are inverted and a one is added to the bits to produce a two's complement negative number, as is known in the art. The two's complement negative number is then added to complete the subtraction. With the two 4-bit in-phase or quadrature signal samples represented in the dot representation of FIG. 6, (two's complemented where appropriate as described above) along with the control signals as a single bit, the bits are reduced as follows: the 3-bits 602 are reduced to a sum bit 604 and a carry bit 606. The remaining add/subtract bit 608 is provided as the least significant bit 610 of the sum. Each additional pair of bits in the same column of the 4-bit numbers generates a sum bit and a carry bit. Bits 612 generate sum bit 614 and carry bit 616. Bits 618 generate sum bit 620 and carry bit 622. Bits 624 generate sum bit 626 and carry bit 628. The outputs from the level A adders are represented by a 4-bit sum 630 and a 5-bit carry 632. Since there are 32 adders in level A, there are 32 such sums and carries representing partial additions of the sixty-four in-phase or quadrature signal samples and sixty-four in-phase or quadrature components of the reference sequence.

The thirty-two carry signals and thirty-two sum signals output from the thirty-two adders 502 in level A are provided as inputs to sixteen adders 504 in level B. As shown in FIG. 5, each adder 504 receives a sum signal and a carry signal from two adjacent adders 502 in level A.

Figure 7:
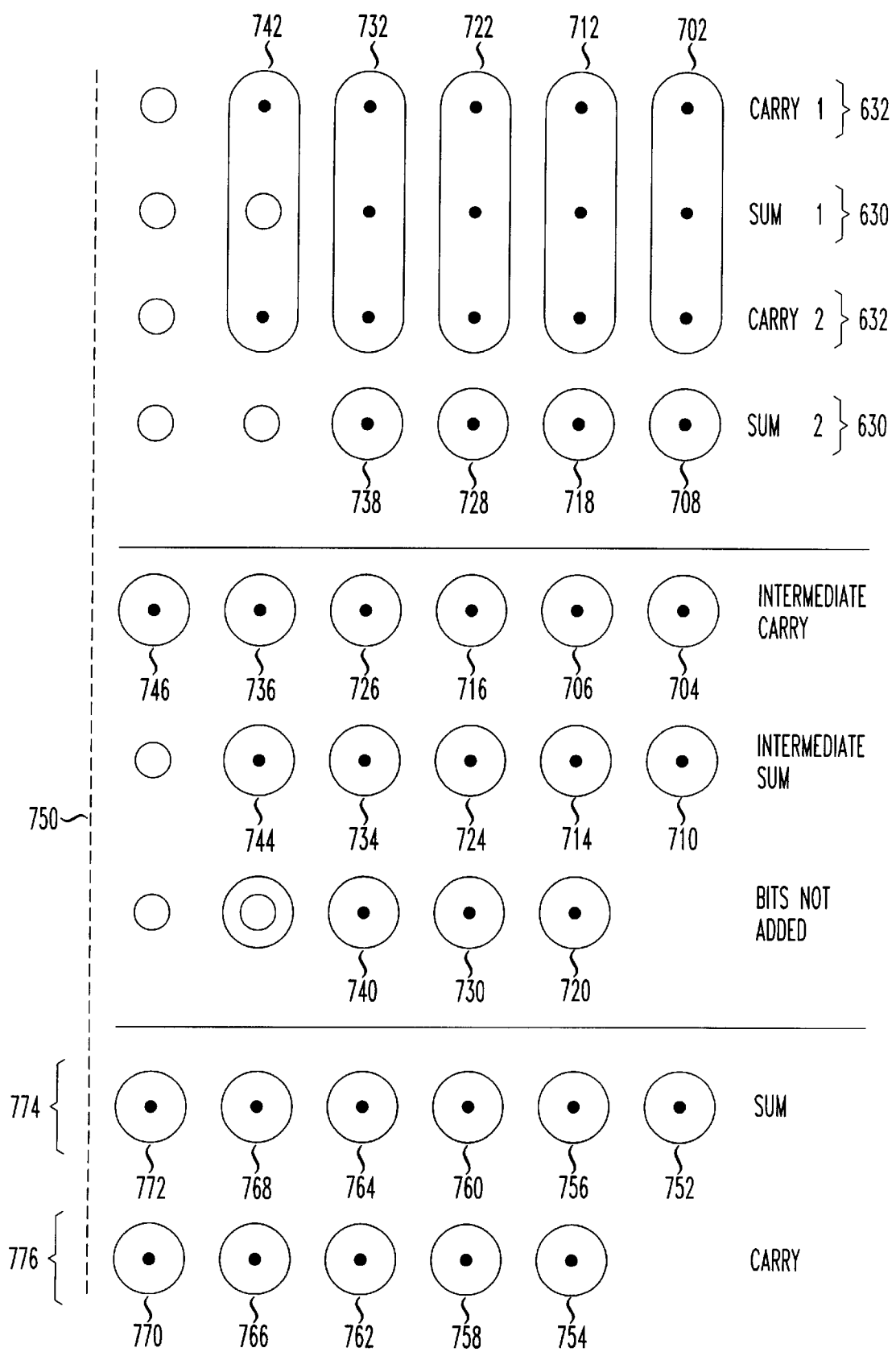
FIG. 7 is a dot representation of the addition in an adder in level B of FIG. 5.

The addition in an adder 504 of level B is illustrated in the dot representation of FIG. 7. Each of the carry terms 632 are sign extended one bit, and the sum terms 630 received from level A are sign extended two bits, so that each of the carry and sum signals are six bits in length. The two sum signals and two carry signals are added in two arrays. Three of the least significant bits 702 are added resulting in an intermediate sum bit 704 and an intermediate carry bit 706. The least significant bit 708 of the other sum 630 added is aligned with sum bit 704 and provided as the least significant bit 710 of the intermediate carry. Each additional three bit group in the same column added produce a sum bit and a carry bit and the remaining bit in the column is aligned with the sum bit produced. The sum of bits 712 produce a sum bit 714 and a carry bit 716. Bit 718 is shifted to the position of bit 720. Similarly, bits 722 are added resulting in sum bit 724 and carry bit 726. Bit 728 is aligned with sum bit 724 as bit 730. Bits 732 are added resulting in sum bit 734 and carry bit 736. Bit 738 is aligned with sum bit 734 as bit 740. Bits 742 are added resulting in sum bit 744 and carry bit 746. Bits extending beyond line 750 are ignored.

With the intermediate sum and intermediate carry generated and bits not added aligned as described above, a second addition operation occurs. Bits 704 and 710 are added resulting in a sum bit 752 and carry bit 754. Bits 706, 714 and 720 are added resulting in a sum bit 756 and a carry bit 758. Bits 716, 724 and 730 are added producing a sum bit 760 and a carry bit 762. Similarly, bits 726, 734 and 740 are added to produce sum bit 764 and carry bit 766. Bits 736 and 744 together with a sign extension are added to produce sum bit 768 and carry bit 770. Bit 746 is added, together with sign extensions for the intermediate sum and a bit not previously added, to produce a sum bit 772. Any carry bits produced in this final sum would extend beyond line 750 and are ignored. This process occurs substantially simultaneously in each of the sixteen adders 504 in level B producing sixteen sums 774 and sixteen carries 776.

The output of each adder 504 results in a 6-bit sum 774 and a 5-bit carry 776. The resulting 5-bit carry has the first bit in the $2^1$ column, with the least significant bit being bit 754.

While the addition could continue in a conventional manner, to simplify the logic and to prevent carries from overflowing, an additional operation may be undertaken either as part of a given level of addition, or between levels of addition. Illustrated in FIG. 5, this additional operation commences either following level B addition, or as part of level B addition. Adders 504 produce a 5-bit carry and a 6-bit sum. Multiple-input, multiple output exclusive OR 506 adds the 5-bit carry and 6-bit sum together, bit by bit as illustrated in the dot representation of FIG. 8.

Figures 8, 9:
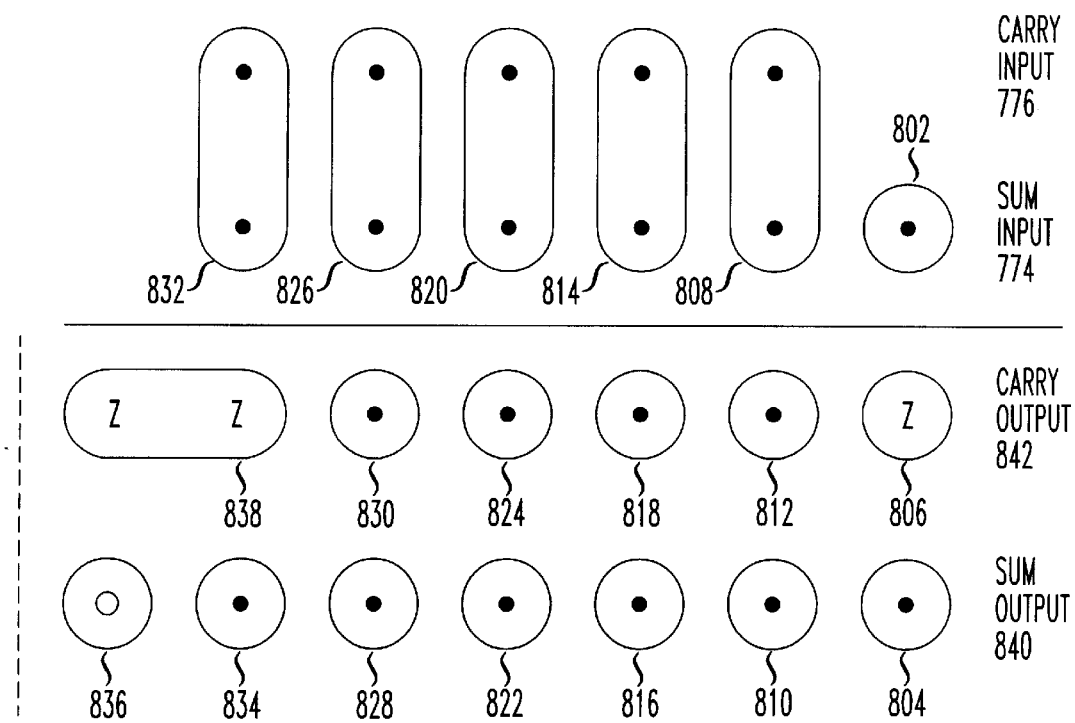
FIG. 8 is a dot representation of the inter-stage operation between levels B and C in FIG. 5.
FIG. 9 is a dot representation of the addition in an adder in level C of FIG. 5.

As shown in FIG. 8, bits 802 are added in exclusive OR 506 resulting in sum bit 804 and carry bit 806. Bits 808 are added resulting in sum bit 810 and carry bit 812. Bits 814 are added resulting in sum bit 816 and carry bit 818. Bits 820 are added resulting in sum bit 822 and carry bit 824. Bits 826 are added resulting in sum bit 828 and carry bit 830. Sum bit 832 is aligned with carry bit 830 as sum output bit 834. The output from exclusive OR 506 provides a 4-bit carry and a 6-bit sum. The carry has been reduced by one bit, at this point in the adder, from a 5-bit carry to a 4-bit carry.

The output from exclusive OR 506 is provided as the input to an adder 508. The sum is sign extended by one bit and the 4-bit carry is zero filled in the least significant bit and the two higher order bits to provide a bit length corresponding to the number of bits in the sign extended sum provided to adder 508. This obviates the need to keep track of one additional column of bits to get the correct sum. The exclusive OR operation is performed on both sets of inputs to each adder 508 of level C. Thus, the level C addition, shown in FIG. 9, is simpler.

The addition in an adder 508 (level C) is illustrated in the dot representation of FIG. 9. Each of the sum terms are sign extended one bit and the carry terms received from EOR 506 are sign extended and zero filled as described above so that the carry and sum signals are seven bits in length. The two sum signals and two carry signals are added in a known manner, as described above with respect to adder 504. This process occurs substantially simultaneously in each of eight adders 508 in level C producing eight sums 950 and eight carries 960.

The output from each adder results in a seven bit sum 950 and a five bit carry 960. The resulting five bit carry has the first significant bit in the 2' column.

As shown in FIG. 10, sum 950 and carry 960 are added in EOR 510 resulting in a modified sum 1060 of seven bits, and a modified carry 1050 of four bits. The carry has been reduced by one bit at this point in the adder from a five bit carry to a four bit carry. The least significant bit in the carry is in the $2^3$ column.

The addition in an adder 512 (level D) is illustrated in the dot representation of FIG. 11. Carries to the left of the dotted line are ignored. Each of the sum terms are sign extended one bit and the carry terms received from EOR 510 are sign extended and zero filled so the sum and carry signals are eight bits in length. Adder 512 produces an eight bit sum and a five bit carry. The least significant bit in the carry is in the $2^3$ column.

As shown in FIG. 12, sum 1160 and carry 1150 are added in EOR 514 resulting in a modified sum 1260 of eight bits and a modified carry 1250 of four bits. The carry has been reduced by one bit at this point in adder 114 from a five bit carry to a four bit carry. The least significant bit in the carry is in the $2^4$ column.

The addition in adder 516 (level E) is illustrated in the dot representation of FIG. 13. Carrier to the left of the dotted line are ignored. Each of the sum terms are sign extended one bit and the carry terms received from EOR 514 are sign extended and zero filled so the sum and carry signals are each nine bits in length. Adder 516 produces a nine bit sum and a five bit carry. The least significant non-trivial bit in the carry is in the $2^4$ column.

As shown in FIG. 14, sum 1360 and carry 1350 are added in EOR 518 resulting in a modified sum 1460 of nine bits and a modified carry 1450 of four bits. The carry has been reduced by one bit at this point in adder 114 from a five carry to a four bit carry. The least significant bit in carry 1450 is in the $2^5$ column.

Figures 15, 16:
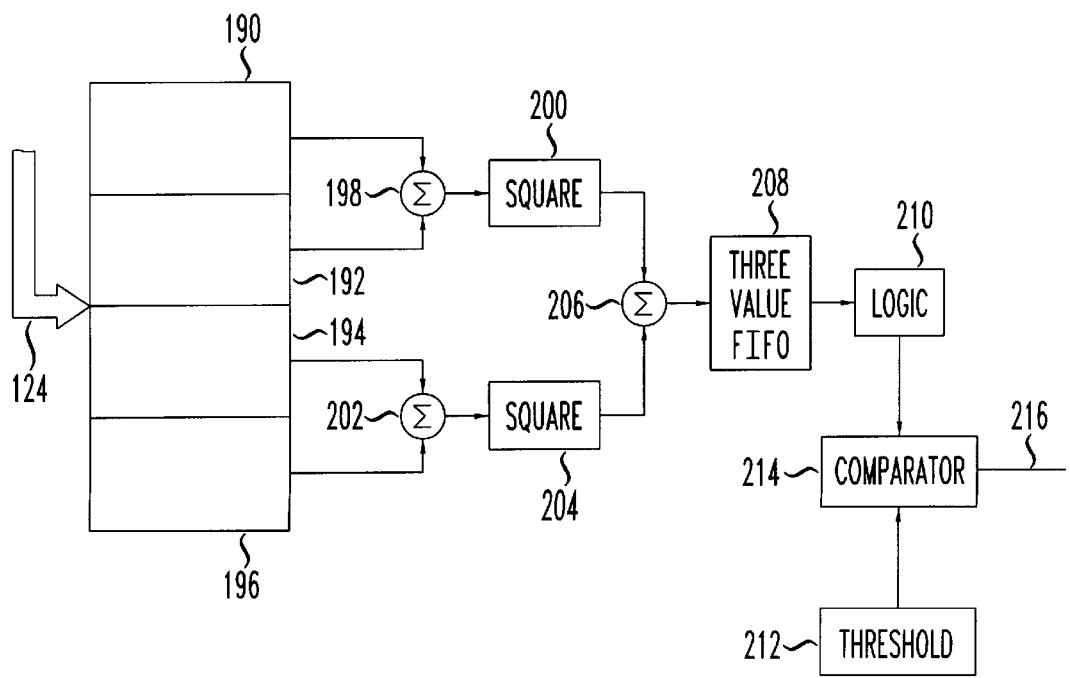
FIG. 15 is a dot representation of the addition in the adder in level F of FIG. 5.
FIG. 16 is a block diagram illustrating calculation of the square magnitude of the correlation, and the comparison of the square magnitude of the correlation to a predetermined threshold.

The addition in adder 520 (level F) is illustrated in the dot representation of FIG. 15. Carries to the left of the dotted line are ignored. Each of the sum terms received by adder 516 is sign extended one bit and the carry terms received from EOR 518 are sign extended and zero filled so the sum and carry signals are each ten bits. Adder 520 produces a ten bit sum 1560 and a 10 bit carry, the least significant bits of which are zero. Sum 1560 is output 124 of adder 114 shown in FIG. 2 and represents a dot product of the vector inputs to adder 114.

The outputs from adders 502 in level A are produced at about the same time. As the additions progress through levels, a ripple begins to, be evident, such that calculation of at least significant bits of level D can commence before the most significant bits of level C are completed. Thus, a ripple carry adder for each of adders 502, 504, 508, 512, 516 and 520 will suffice.

Figure 6:
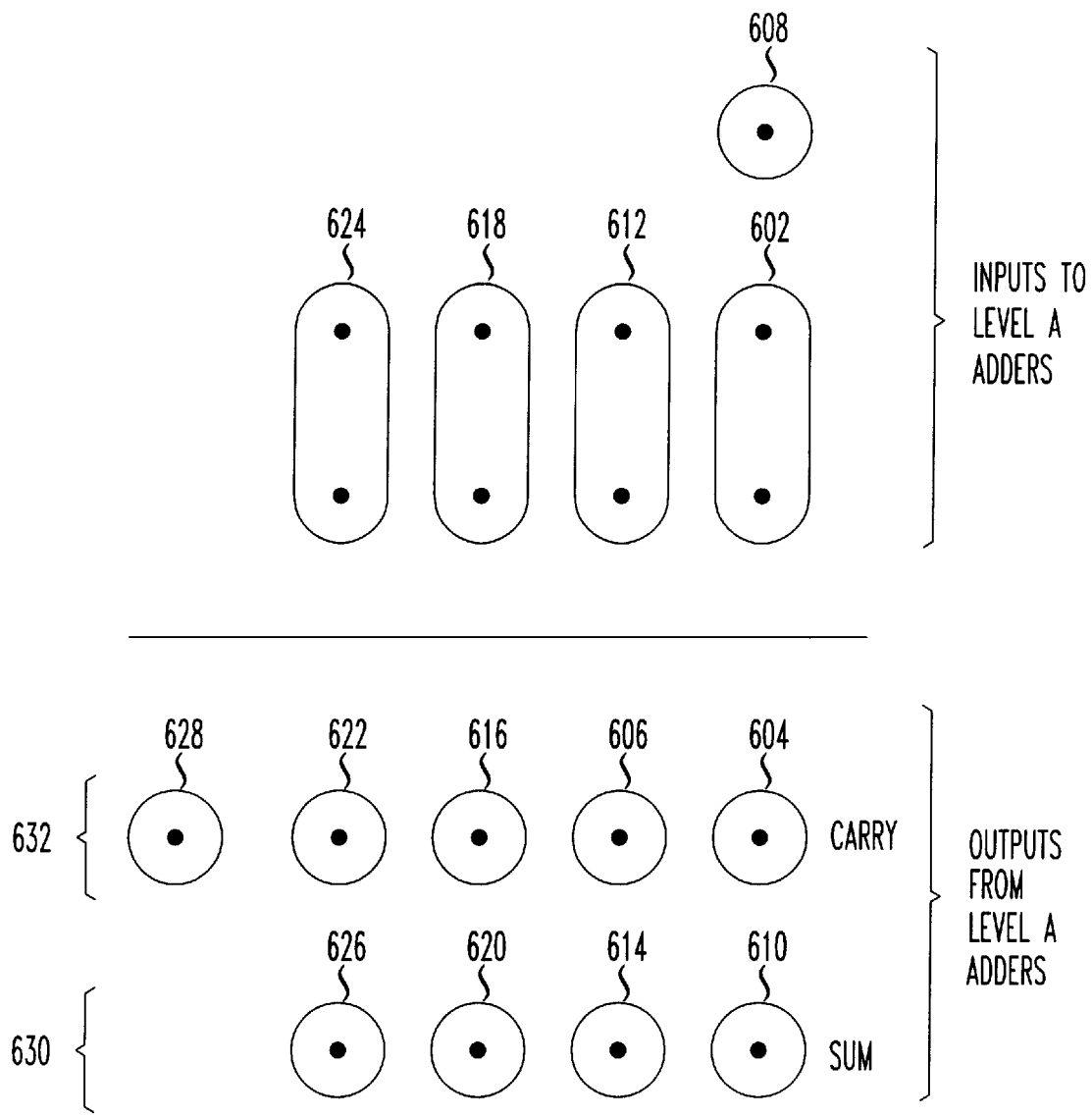
FIG. 6 is a dot representation of the addition in an adder in level A of FIG. 5.

Four real correlations are calculated. They are: (1) the correlation of in-phase signal 50 with in-phase components of the reference sequence, the result of which is stored temporarily in register 190; (2) the correlation of quadrature signal 52 with quadrature components of the reference sequence, result of which is temporarily stored in register 192; (3) the correlation of in-phase signal 50 with quadrature components of the reference sequence, the result of which is temporarily stored in register 194; and (4) the correlation of quadrature signal 52 with in-phase components of the reference sequence, the result of which is temporarily stored in register 196. With each of the four real correlations completed, FIG. 6 illustrates calculation of the square magnitude of the correlation and comparison of the square magnitude of the correlation to a predetermined threshold. The square magnitude of the correlation is calculated as follows:

$$\text{Square Magnitude} = [cc_r(n)]^2 + [cc_i(n)]^2 \quad (4)$$

The real components, stored in registers 190 and 192 are added such as in adder 198, and squared as in square 200 then presented as a first input to adder 206. The imaginary components, stored in registers 194 and 196, are added such as in adder 202, and squared as in square 204, then presented as a second input to adder 206. The output of adder 206 is the square magnitude of the correlation as indicated by equation (4).

A three-value window of the square magnitude of the correlation is retained in first-in-first-out register 208. Rather than compare each correlation value as calculated to a threshold, since it is desired to determine whether the largest (a peak) correlation has occurred, only when the middle value of the three correlation values is greater than the other two correlation values, such as determined by logic 210, is the correlation value compared to a threshold 212 by comparator 214 to provide output 216.

In operation, the receiver operates in two modes, an acquisition mode and a synchronization data mode. Initially, memory 104 is filled sequentially with in-phase and quadrature sample values. The eighth from last bit of barrel shift decoder 108 is initialized to one while the other 511 bits of barrel shift decoder 108 are set to zero. The first bit of barrel shift decoder 110 and every eighth (nth) successive bit is also set to a logic one. All other bits of barrel shift decoder 110 are set to zero.

The shift registers 118 and 120 are latched, respectively, with the quadrature and in-phase components of the reference sequence from reference sequence register 116. Shift registers 118 and 120 are initialized to the 64 chip reference sequence, such that the first chip of the reference sequence is loaded into the first in-phase and quadrature memory locations of the respective shift registers 120 and 118. With barrel shift decoder 108 pointing to the eighth from last memory location and the barrel shift decoder 110 pointing to the first location and every successive eighth (more generally $n^{th}$) location, the most recently received complex in-phase and quadrature signal values are enabled to the eighth from the last location in memory changing the state of that memory location to reflect the most recently received and stored in-phase and quadrature signal 50 and 52. With barrel shift decoder 110 enabling the output of that memory location, and every eighth previous memory location, the most recently received in-phase signal 50 and quadrature signal 52, complex sample, immediately propagate through the memory location to adder 114. The output of every eighth previous old memory cell is also enabled, 64 values in all in the illustrative embodiment showing an IS-95 implementation. Adder 114 takes the 64 enabled 4-bit memory values and the corresponding 64 reference sequence components from reference sequence register 116. Each of the reference sequence components indicates whether the corresponding in-phase signal 50 or quadrature signal 52 samples obtained from memory 104 are to be added or subtracted in adder 114. Adder 114 outputs a vector dot-product or correlation of the two input vectors.

For a given set of in-phase signal 50 and quadrature signal 52 complex samples in memory, and the reference sequence in reference sequence register 116, a dot-product state machine, I/Q select 112, cycles through four 2-bit combinations to select the four vector dot products required in a complex correlation. The dot product state machine is clocked at a clock rate that is five times the sample rate, for example, 9.803 MHz for IS-95. Four rising edges of the clock are used to select four real vector dot products that comprise the complex correlation. The outputs of adder 114 are latched into a 4 by 10-bit memory shown in FIG. 6 as registers 160, 162, 164 and 166. The two terms that form the imaginary value are squared and added to the square of the sum of the two vector dot products that form the real component. The resultant non-coherent correlation energy value is stored for peak and threshold detection in a signal detect logic circuit.

With the four real correlations completed, barrel shift decoder 108 and barrel shift decoder 110 each rotate one bit. Barrel shift decoder 108 then enables the most recently received in-phase signal 50 and quadrature signal 52 samples to be written to the second memory location simultaneously with barrel shift decoder 110 enabling the second value of the 64 8-sample groups. The four vector dot products are then calculated as described above based on the new data window. This process is performed for eight positions of the barrel shift decoders 108 and 110.

The process thus described tests for the presence of a signal over eight fractional chip delays. After the first eight complex correlations are performed, the reference sequence register is rotated one-bit simultaneously with the barrel shifters 108 and 110 shifting by one-eighth chip. The first value of the reference sequence is positioned in the second stage of the reference sequence register and the last bit of the reference sequence is in the first location of the reference sequence register. This is accomplished by a circular rotation of ring shift registers 118 and 120. Similarly, barrel shift decoder 108 has wrapped around and is pointing to the first memory location where the most recent in-phase signal 50 and quadrature signal 52 complex sample is written, and the oldest in-phase and quadrature complex sample is stored in the second memory location. Barrel shift register 110 which was pointing to the last in-phase and quadrature signal complex sample of the eight sample groups has also wrapped around and points to the first in-phase and quadrature signal complex sample of the eight sample groups. The above-described process is repeated eight times (more generally, n times) with the exception that the barrel shift decoder 108 will wrap around and point successively to the first group of eight sample values. The correlation process described above continues with barrel shift decoders 108 and 110 shifting at a first clock rate and the reference sequence shifting at a second clock rate. The first and second clock rates may be related, such as by one being an integer multiple of the other.

A new segment of the reference sequence is shifted into ring shift registers 118 and 120, each 64-chip time intervals.

The smallest unit of information is a chip, a chip represents a change in-phase and thus a change in polarity of signal. The IS-95 chip rate is 1.2288 MHz, therefore the maximum rate of change of polarity is 1.2288 MHz. There are two components of the chip sequence referred to as the in-phase sequence and the quadrature sequence. The following describes how these chips are created.

The different channels of the transmit signal are represented by 64 different 64-chip orthogonal sequences. For any particular data channel, a chip stream is first created by outputting the same 64 chip Walsh sequence for each 19.2 KHz data bit. If the bit is a one, the polarity of the entire Walsh sequence is preserved. If the data bit is a zero, the polarity of the entire Walsh sequence is inverted by exploring the data bit with all 64 chips of the Walsh sequence. The 1.2288 MHz output stream is then stored with the in-phase pseudo-noise sequence and the quadrature pseudo-noise sequence to create two separate chip sequences.

The in-phase and quadrature pseudo-noise sequences are created by two separate 15 bit shift registers. The parity of selected bits from the present state of the shift register is calculated and fed back to the least significant bit for the next state. The in-phase and quadrature shift registers have separate feedback networks to create two independent sequences. The 15 bit shift registers are clocked at 1.2288 MHz and the parity outputs are taken to create the in-phase and quadrature 1.2288 MHz pseudo-noise bit streams. A state defined as the pilot rollover state occurs when each shift register goes to the all zero state and the least significant bit of the shift register is stuffed with a one. Thus, there are $2^{15}-1$ states in the pseudo-noise bit stream before it repeats.

The chip sequences are then converted from ones and zeros to a zero DC (direct current) sequence of +1's and −1's. All 64 of the zero DC chips sequences produced from 64 Walsh channels are summed. The resulting in-phase and quadrature sequences are fed to two separate but identical Nyquist low-pass filters. The output of the in-phase filter is modulated with an in-phase intermediate frequency cosign wave, and the output of the quadrature filter is modulated with the quadrature sign wave signal. The outputs of the two modulators are summed and fed to an RF mixer. Because of the Nyquist filters, there is no inter-chip interference. This allows the uncorrupted complex baseband sequence to be uniquely defined by two separate sequences of 1's and −1's, when sampled at the chip rate which also happens to be the Nyquist rate for the complex signal.

In noisy environments, operation of the communication system 20 may require a greater number of chips for correlation than the 64 referred to thus far as employed by IS-95. In noisy environments, twice as many chips may be used for correlation with a matching filter of corresponding length. The correlation can be achieved in two parts. Firstly, the first half of the matching filter can be correlated to the last half of chips at one time. Secondly, the second half of the matching filter can be correlated to the first half of the chips every subsequent time. The results can be added together and may require additional adders.

The invention is particularly useful in communication systems in equipment employing integrated circuits including this technique. Such communications systems and equipment have the advantage of reduced complexity of circuitry to accomplish the signal processing.

While the illustrative embodiment has been described as useful when implementing the IS-95 standard, the invention is not limited thereto. Furthermore, the invention is not limited to rake receiver implementation. The specific number of chip segments discussed in the illustrative embodiment should not be considered limiting. For example, in a noisy channel there may be a need to filter larger chip segments. While the illustrative embodiment has been described in the context of a cellular communication system in accordance with IS-95, involving portable or mobile radio telephones and/or personal communications networks, the present invention is not limited thereto and may be applied to other communications applications. Barrel shift decoders may be implemented in any known manner.

While the illustrative embodiment has not been described as incorporating pipelining, one skilled in the art would recognize the enhanced computational efficiency available by utilizing pipelining in the design. Pipelining is achieved by initiating computation with a new data set before completing computations with a previous data set. The more latches used in pipelining, the greater the depth of pipelining. Pipelining causes an initial latency in computation time required to fill the pipeline, but maximizes usage of resources such as adders.

The invention can be fabricated using known very large scale integrated circuit processes in one or more integrated circuits. The invention would most efficiently be fabricated in a single integrated circuit and may be fabricated on the same silicon as a microprocessor or a digital signal processor.

The invention claimed is:

1. A receiver for a spread spectrum communication system in which a transmitter transmits a data signal to a receiver, the receiver comprising:
   a memory for storing digital representations of a data signal received by the receiver;
   a barrel shift input to the memory to define a circulating data window;
   a first ring shift register for circulating a first set of components of a spreading code;
   a second ring shift register for circulating a second set of components of a spreading code;
   a selector for selecting one of the first set of components or the second set of components as selected components of the spreading code; and an adder for receiving as inputs digital representations of the data signal from the circulating data window and the selected components of the spreading code, a barrel shift output from the memory for providing selected outputs from the memory as inputs to the adder, the adder for providing as an output the dot product of the inputs.

2. A receiver as recited in claim 1, fabricated in an integrated circuit.

3. A receiver as recited in claim 1, wherein the receiver is part of a handset.

4. A receiver as recited in claim 1, wherein the receiver is part of a base station.

5. A receiver for a spread spectrum communication system in which a transmitter transmits a data signal to a receiver, the receiver comprising:

a memory for storing digital representations of a data signal received by the receiver;

a barrel shift input to the memory to define a circulating data window;

a first ring shift register for circulating a first set of components of a spreading code;

an inject circuit interposed between the barrel shift input and the memory, the inject circuit for selecting a memory location to overwrite with a more current digital representation of a data sample;

a second ring shift register for circulating a second set of components of a spreading code;

a selector for selecting one of the first set of components or the second set of components as selected components of the spreading code; and an adder for receiving as inputs digital representations of the data signal from the circulating data window and the selected components of the spreading code, the adder for providing as an output the dot product of the inputs.

6. A receiver as recited in claim 5, fabricated in an integrated circuit.

7. A receiver as recited in claim 5, wherein the receiver is part of a handset.

8. A receiver as recited in claim 5, wherein the receiver is part of a base station.

9. A receiver for a spread spectrum communication system in which a transmitter transmits a data signal to a receiver, the receiver comprising:

a memory for storing digital representations of a data signal received by the receiver;

a barrel shift input to the memory to define a circulating data window;

a first ring shift register for circulating a first set of components of a spreading code;

a second ring shift register for circulating a second set of components of a spreading code;

a selector for selecting one of the first set of components or the second set of components as selected components of the spreading code; and an adder for receiving as inputs digital representations of the data signal from the circulating data window and the selected components of the spreading code, the adder having a plurality of adder levels, the plurality of adder levels including a first adder level and a second adder level, multibit sum and carry outputs from the first adder level being provided as inputs to the second adder level, the bits of the multibit sum and carry being added bit-by-bit to provide a modified sum and a modified carry, the modified carry having a reduced number of bits, the adder for providing as an output the dot product of the inputs.

10. A receiver as recited in claim 9, fabricated in an integrated circuit.

11. A receiver as recited in claim 9, wherein the receiver is part of a handset.

12. A receiver as recited in claim 9, wherein the receiver is part of a base station.

13. A method of communicating a sequence of data symbols, comprising the steps of receiving a signal;

storing digital representations of the received signal;

defining a circulating data window;

circularly shifting a first set of components of a spreading code;

circularly shifting a second set of components of a spreading code;

selecting one of the first and second sets of components of the spreading code as a selected set of components; and adding selected ones at the stored digital representations of the received signal identified by the circulating data window and the selected set of components to obtain a correlation value.

14. A method of communicating a sequence of data symbols, comprising the steps of receiving a signal;

storing digital representations of the received signal;

defining a circulating data window;

selecting a memory location to overwrite with a more current digital representation of a data sample;

circularly shifting a first set of components of a spreading code;

circularly shifting a second set of components of a spreading code;

selecting one of the first and second sets of components of the spreading code as a selected set of components; and adding digital representations of the received signal identified by the circulating data window and the selected set of components to obtain a correlation value.

15. A method of communicating a sequence of data symbols, comprising the steps of receiving a signal;

storing digital representations of the received signal;

defining a circulating data window;

circularly shifting a first set of components of a spreading code;

circularly shifting a second set of components of a spreading code;

selecting one of the first and second sets of components of the spreading code as a selected set of components;

adding digital representations of the received signal identified by the circulating data window and the selected set of components to obtain a correlation value;

providing as inputs to a second adder level bits of a multibit sum and carry from a first adder level; and adding the bits of the multibit sum and carry to produce a modified sum and modified carry, the modified carry having a reduced number of bits.

* * * * *